(12) United States Patent
Dilillo et al.

(10) Patent No.: US 11,872,963 B2
(45) Date of Patent: Jan. 16, 2024

(54) MOTOR VEHICLE PROVIDED WITH A FILLING DEVICE FOR FILLING A TANK WITH WIPER FLUID

(71) Applicant: FCA ITALY S.p.A., Turin (IT)

(72) Inventors: Alberto Dilillo, Turin (IT); Andreas Wuppinger, Turin (IT); Michele Longo, Turin (IT); Daniele Calonaci, Turin (IT)

(73) Assignee: FCA ITALY S.p.A., Turin (IT)

( * ) Notice: Subject to any disclaimer, the term of this patent is extended or adjusted under 35 U.S.C. 154(b) by 624 days.

(21) Appl. No.: 16/786,211

(22) Filed: Feb. 10, 2020

(65) Prior Publication Data
US 2020/0254978 A1 Aug. 13, 2020

(30) Foreign Application Priority Data
Feb. 11, 2019 (EP) .................................... 19156526

(51) Int. Cl.
| | | |
|---|---|---|
| *B60S 1/50* | (2006.01) | |
| *B60S 1/52* | (2006.01) | |
| *G07C 5/08* | (2006.01) | |
| *B60N 3/10* | (2006.01) | |

(52) U.S. Cl.
CPC .................. *B60S 1/50* (2013.01); *B60N 3/10* (2013.01); *B60S 1/52* (2013.01); *G07C 5/0825* (2013.01); *G07C 5/0833* (2013.01)

(58) Field of Classification Search
CPC ...................................................... B60N 3/10
See application file for complete search history.

(56) References Cited

U.S. PATENT DOCUMENTS

| | | | | |
|---|---|---|---|---|
| 5,651,259 A | * | 7/1997 | Twyman | B60S 1/50 62/93 |
| 5,853,025 A | * | 12/1998 | Daneshvar | B60S 1/50 239/284.1 |
| 5,946,763 A | * | 9/1999 | Egner-Walter | B60S 1/0416 15/250.02 |
| 8,544,891 B2 | * | 10/2013 | Kitagawa | B60S 1/50 239/284.1 |

(Continued)

FOREIGN PATENT DOCUMENTS

| | | | | |
|---|---|---|---|---|
| CA | 2586964 A1 | 10/2008 | | |
| DE | 4436023 A1 | * 4/1995 | | ................ B60S 1/48 |

(Continued)

OTHER PUBLICATIONS

Office Action issued in corresponding European Application No. 19156526.6 dated May 27, 2021 (5 pages).

(Continued)

*Primary Examiner* — Spencer E. Bell
*Assistant Examiner* — Omair Chaudhri
(74) *Attorney, Agent, or Firm* — Harness, Dickey & Pierce, P.L.C.

(57) ABSTRACT

A motor vehicle has a passenger compartment, a tank designed to contain a wiper fluid and a dispensing device, which is connected to the tank and is operable to dispense and/or spray the wiper fluid on a transparent wall, for example on a windshield; the motor vehicle further has a filling device provided with at least one duct to feed the wiper fluid into the tank; said duct having an inlet that is arranged in the passenger compartment.

11 Claims, 1 Drawing Sheet

(56) References Cited

U.S. PATENT DOCUMENTS

| | | | | |
|---|---|---|---|---|
| 8,671,977 B2* | 3/2014 | Gonzales Sanz | ......... | B60S 1/50 220/666 |
| 2012/0192959 A1* | 8/2012 | Wein | ......... | B60S 1/50 137/98 |
| 2013/0206266 A1* | 8/2013 | Stenhouse | ......... | C02F 1/32 137/899.4 |
| 2014/0211494 A1* | 7/2014 | Duffe | ......... | B60R 1/12 362/516 |
| 2015/0114488 A1* | 4/2015 | Zaitz | ......... | B60S 1/50 137/355 |
| 2016/0152212 A1* | 6/2016 | Ernst | ......... | B60K 15/04 220/86.1 |
| 2018/0215352 A1* | 8/2018 | Barret | ......... | G05D 9/12 |
| 2019/0271579 A1* | 9/2019 | Weigert | ......... | G01F 23/804 |
| 2020/0122691 A1* | 4/2020 | Werner | ......... | B60S 1/481 |
| 2021/0188217 A1* | 6/2021 | Jansson | ......... | B60H 1/32331 |
| 2021/0197769 A1* | 7/2021 | Shirakura | ......... | B60S 1/486 |

FOREIGN PATENT DOCUMENTS

| | | | | |
|---|---|---|---|---|
| DE | 19833465 | A1 | 2/2000 | |
| DE | 19912294 | A * | 9/2000 | ......... B60R 13/07 |
| DE | 19912294 | A1 | 9/2000 | |
| DE | 10053592 | A1 * | 5/2002 | ......... G01F 23/242 |
| DE | 10059081 | A1 * | 6/2002 | ......... B60S 1/481 |
| DE | 10123180 | A1 * | 11/2002 | ......... B60S 1/50 |
| DE | 10057980 | A1 | 12/2002 | |
| DE | 10138466 | A1 * | 4/2003 | ......... B60S 1/481 |
| DE | 102004045149 | A1 * | 6/2005 | ......... B60S 1/50 |
| DE | 102013012630 | A1 * | 1/2015 | ......... B60S 1/50 |
| DE | 102015114972 | A1 | 7/2016 | |
| EP | 2236367 | A1 | 10/2010 | |
| FR | 2898565 | A1 * | 9/2007 | ......... B60S 1/481 |
| FR | 2930225 | A1 * | 10/2009 | ......... B60R 13/07 |
| FR | 2981899 | A1 * | 5/2013 | ......... B60S 1/50 |
| FR | 3042763 | A1 * | 4/2017 | |
| FR | 3044991 | A1 * | 6/2017 | |
| GB | 2422091 | A | 7/2006 | |
| JP | S6180143 | U | 5/1986 | |
| JP | 2007062479 | A | 3/2007 | |
| JP | 2007062479 | A * | 3/2007 | |
| JP | 2013248956 | A * | 12/2013 | ......... B60S 1/50 |
| KR | 200204513 | Y1 * | 11/2000 | |
| KR | 20070022998 | A * | 2/2007 | |
| KR | 20160052168 | A * | 5/2016 | |
| KR | 20160063810 | A * | 6/2016 | ......... B60S 1/50 |

OTHER PUBLICATIONS

Extended European Search Report issued in corresponding European Patent Application No. 19156526.6 dated Jul. 19, 2019.

* cited by examiner

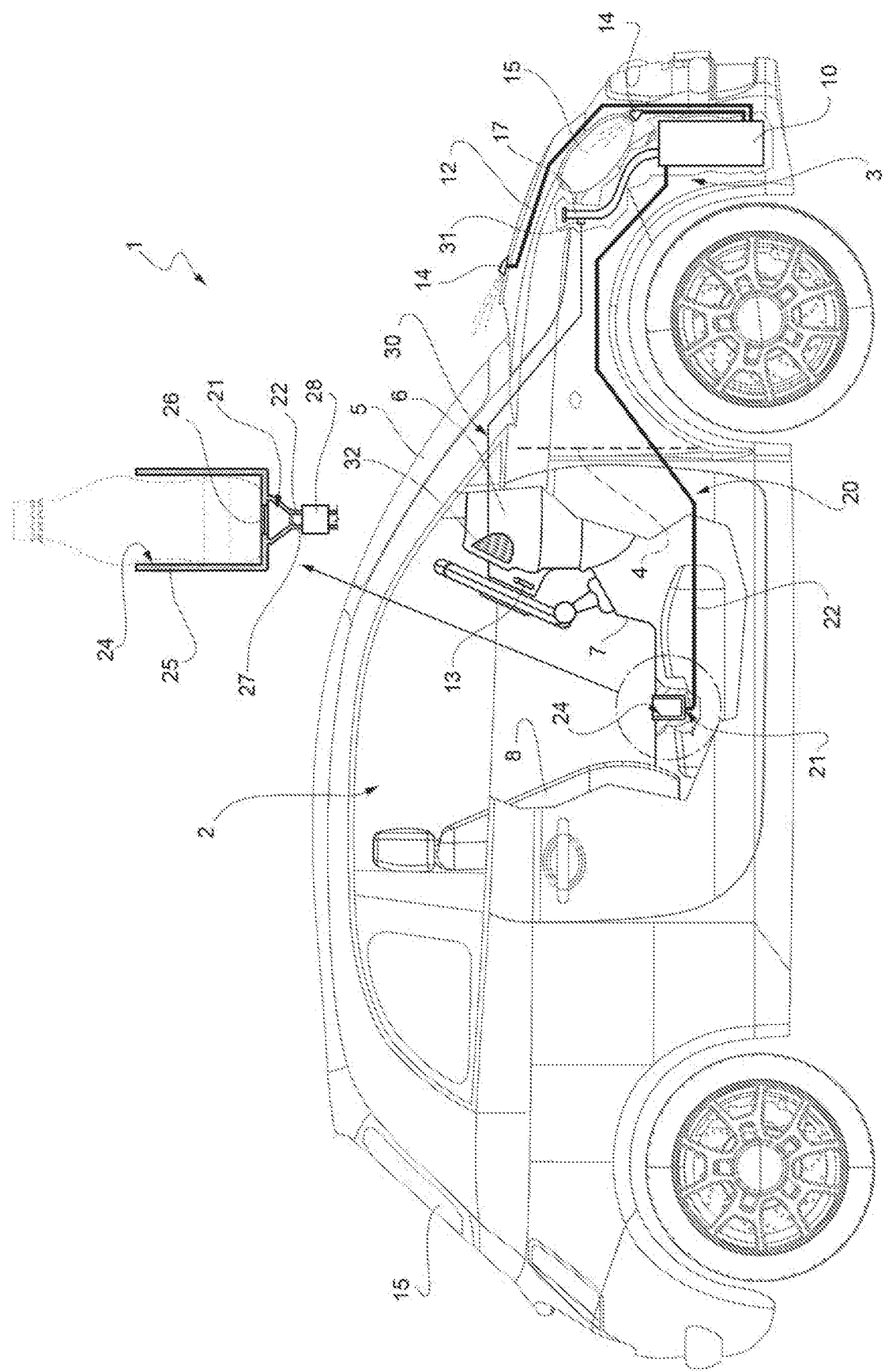

MOTOR VEHICLE PROVIDED WITH A FILLING DEVICE FOR FILLING A TANK WITH WIPER FLUID

CROSS-REFERENCE TO RELATED APPLICATION

This patent application claims priority from European patent application no. 19156526.6 filed on Feb. 11, 2019, the entire disclosure of which is incorporated herein by reference.

FIELD

The present invention relates to a motor vehicle provided with a filling device for filling a tank with a wiper fluid.

BACKGROUND

As already known, for cleaning the windshield and any other transparent outer walls, in the engine compartment the motor vehicles have a tank that contains a wiper fluid and is provided with an inlet nozzle to be filled or refilled. The filling of this tank is normally performed by the driver, when this latter finds that the control elements for spraying the wiper fluid no longer work. In this case, the driver must get out of the passenger compartment, open the engine compartment to gain access to the inlet nozzle and finally pour the wiper fluid through this nozzle.

In new-concept vehicles, particularly those of an electric and/or hybrid type, the access to the engine compartment can even be forbidden to the driver to avoid any unpleasant accident with the electrical voltage at which the electric motors operate.

It is therefore felt the need to fill the aforementioned tank without the driver necessarily and directly having access to the engine compartment.

BRIEF DESCRIPTION OF THE DRAWINGS

For a better understanding of the present invention, it is now described a preferred embodiment purely by way of non-limiting example with reference to the attached drawing, which schematically shows in a side view a motor vehicle provided with a filling device for filling a tank with a wiper fluid according to the present invention.

In the attached FIGURE, the reference number 1 indicates, as a whole, a motor vehicle (schematically and partially shown).

DETAILED DESCRIPTION OF INVENTION

The present disclosure advantageously includes a motor vehicle provided with a filling device for filling a tank with a wiper fluid, which allows fulfilling the aforesaid requirement in a simple and inexpensive way.

The motor vehicle 1 comprises a passenger compartment 2 and an engine compartment 3, which is separated from a lower area of the passenger compartment 2 by means of at least one bodywork wall (also known as "fireproof wall") and/or by similar partition elements, which are indicated by the reference number 4 and have a shape, size and position such as to be able to carry out this function of physical separation and, preferably, of thermal and/or acoustic insulation too.

The motor vehicle 1 comprises: a windshield 5, which delimits an upper area of the passenger compartment 2 at the front; a dashboard 6 arranged in a front area of the passenger compartment 2 under the windshield 5; and a tunnel element 7, which extends in the passenger compartment 2 from the dashboard 6 downwards and backwards in a longitudinal direction, between two front seats 8.

The motor vehicle 1 further comprises a tank 10, designed to contain a wiper fluid and generally referred to as the wiper fluid compartment. The tank 10 is preferably arranged in the engine compartment 3 in a fixed position. The tank 10 is connected to at least one dispensing or spraying device, indicated by the reference number 12, operable by the driver by means of suitable control elements 13 (e.g. by means of levers or knobs) located in the dashboard 6, to dispense/spray the wiper fluid through nozzles 14 towards the outer surface of the windshield 5 and/or towards the outer surface of any other transparent wall 15 (e.g. the rear window or any wall crossed, in use, by the light emitted by optical groups of the motor vehicle 1). The tank 10 communicates with a filling duct 17, arranged in the engine compartment 3 and closed by a plug, which can be removed to feed wiper fluid into the tank 10 through the duct 17. Preferably, the duct 17 and the tank 10 are made in a single piece, in plastic material.

According to an aspect of the present invention, the motor vehicle 1 further comprises a filling device 20 for filling the tank 10 with wiper fluid without having to use the duct 17. The device 20 comprises an inlet 21, which is arranged in the passenger compartment 2 and communicates with the tank 10 by means of a pipe or duct 22. In this way, the driver can feed the wiper fluid (e.g. water or a mixture of water and detergent) into the tank 10, pouring it through the inlet 21 and then operating directly from the passenger compartment 2. In the shown example, the duct 22 preferably extends through the partition elements 4 to reach the tank 10 in the engine compartment 3. According to a variant not shown, also the tank 10 is arranged in the passenger compartment 2, for example between the dashboard 6 and the partition elements 4. According to the preferred embodiment shown, the inlet 21 is arranged at the bottom of a compartment 24, defining a basin or a funnel, in which the driver can easily pour the wiper fluid. The compartment 24, in other words, lets the wiper fluid flow towards the inlet 21 and avoids pouring this liquid on other parts of the passenger compartment 2.

Preferably, the compartment 24 is defined by a cup-holder or drink-holder element 25, as shown in the enlarged view of the attached FIGURE. In other words, the compartment 24 has such a size and shape to be able to house the lower part of a glass, of a can or of a bottle with a limited or with no clearance to hold the glass/can/bottle during the travel of the motor vehicle 1. In the shown example, the compartment 24 is open at the top, however possible variants could provide a cap or a closing door above the compartment 24.

Alternatively, the compartment 24 could be defined by a simple storage element.

Preferably, the device 20 further comprises an openable closing element 26 and/or a filtering element 27, arranged at the bottom of the compartment 24 and/or at the inlet 21, to prevent any dirt from entering the duct 22. For example, the filtering element 27 is defined by a valve, by a grid, by a perforated or micro-perforated membrane. On the other hand, the closing element 26 is defined by a plug (which can be manually opened and/or removed) or can be defined by a closing valve, having a shutter that opens in response to a command of the driver or opens automatically in response to the presence of liquid in the compartment 24 (e.g. due to the weight of said liquid).

Preferably, the device 20 further comprises a pump 28, which is arranged along the duct 22, is preferably motorized and is automatically operated (e.g. in response to the presence of liquid in the compartment 24) or in response to a command of the driver to transfer the wiper fluid from the inlet 21 to the tank 10. The pump 28 may not be necessary if the inlet 21 is high enough with respect to the tank 10 so that the wiper fluid can reach the tank 10 through the hydrostatic swing only.

Preferably, the device 20 comprises a signalling system 30 to indicate to the driver in the passenger compartment 2 that the tank 10 has been sufficiently filled, i.e. that the level of wiper fluid in the tank 10 and/or in the duct 17 and/or in the duct 22 has reached a preset threshold level. In particular, the system 30 comprises at least one sensor 31, which is arranged at the tank 10 and/or at the duct 17 and/or at the duct 22 and is configured to detect the amount of wiper fluid stored; and at least one warning element 32, which is arranged in the passenger compartment 2 and operates in response to signals received from the sensor 31 to emit an acoustic and/or sound signal when the wiper fluid reaches the aforementioned preset threshold level.

From the foregoing it is clear that the driver can fill the tank 10 from the passenger compartment 2, namely without getting out of the vehicle 1, when he realizes that the controls elements 13 for spraying the wiper fluid no longer work and therefore that there is no wiper fluid in the tank 10.

Moreover, the features of the proposed solution make it simple and extremely useful and effective.

Finally, it is clear from the foregoing that the motor vehicle 1 described and schematically shown in the attached FIGURE can be subjected to modifications and variations that do not depart from the scope of protection of the present invention as defined in the attached claims.

In particular, the shape and arrangement of the various components could be different from the one indicated by way of example.

The invention claimed is:

1. A motor vehicle comprising:
   a passenger compartment;
   an engine compartment;
   at least one transparent wall having an outer surface arranged outside of the passenger compartment and the engine compartment;
   a tank arranged in said engine compartment and configured to contain a wiper fluid;
   a dispensing device connected to said tank and operable to deliver and/or spray the wiper fluid on said outer surface;
   a filling device comprising:
     at least one duct to feed the wiper fluid into said tank, said duct having an inlet arranged in said passenger compartment, the inlet arranged at the bottom of a compartment defining a basin or a funnel in which a driver can easily pour the wiper fluid; and
     a closing element to prevent dirt from entering the duct;
   wherein said closing element is openable and is arranged at said inlet;
   wherein said motor vehicle comprises a further duct to feed the wiper fluid into said tank, said further duct being arranged in said engine compartment;
   wherein said further duct includes a first end connected to said tank and a second end closed by a plug, said plug is configured to be removed to feed wiper fluid into the tank through the further duct;
   wherein said further duct extends at least vertically between said first end and said second end; and
   wherein the further duct and the at least one duct connect to the tank at different locations, and are not directly connected to each other.

2. The motor vehicle according to claim 1, wherein said compartment is defined by a storage element.

3. The motor vehicle according to claim 1, wherein said compartment is defined by a cup-holder element.

4. The motor vehicle according to claim 1, wherein said closing element is defined by a plug, which can be manually opened and/or removed.

5. The motor vehicle according to claim 1, wherein said filling device comprises a filtering element arranged at said inlet.

6. The motor vehicle according to claim 5, wherein said filtering element is defined by at least one of: a valve, a grid, a perforated or micro-perforated membrane.

7. The motor vehicle according to claim 1, wherein said filling device comprises a pump arranged along said duct.

8. The motor vehicle according to claim 1, wherein said filling device comprises a signaling system configured to indicate, in said passenger compartment, that said tank has been filled up to a preset level.

9. The motor vehicle according to claim 8, wherein said signaling system comprises:
   at least one sensor configured to detect an amount of wiper fluid stored in said tank; and
   a warning element, which is arranged in said passenger compartment and operates in response to signals received from said sensor to emit an acoustic and/or a visual signal when the wiper fluid reaches said preset level.

10. The motor vehicle according to claim 1, wherein said closing element is defined by a closing valve having a shutter that opens in response to a command of the driver.

11. The motor vehicle according to claim 1, wherein said closing element is defined by a closing valve having a shutter that opens automatically in response to the presence of the wiper fluid in the compartment.

* * * * *